United States Patent Office 2,736,710
Patented Feb. 28, 1956

2,736,710
VARNISH REMOVER

Herman R. Nack, Troy, and Leo J. Novak, Dayton, Ohio, assignors to Chadeloid Corporation, Dayton, Ohio, a corporation of Delaware No Drawing. Application June 29, 1951,
Serial No. 234,476

2 Claims. (Cl. 252—170)

This invention relates to a remover of paint, varnish, lacquer and enamel coatings.

Compositions utilized to protect and finish surfaces generally comprise a pigment dispersed in a vehicle which has the property of forming a tough adherent film over the surface coated. Resinous materials and oils of the drying type for example form such films. Removal thereof from the protected surface is difficult, generally being accomplished by a solvent action on the resin or oil after which the surface is wiped. The solvents employed are necessarily present in the remover at fairly high concentration in order that the resin or oil will be completely solved and that a "gumming" stage in the removal may be avoided.

We have found that an improved paint remover may be formulated which consists essentially of the polysaccharide dextran, a solvent for the polysaccharide and a relatively small proportion of a paint remover solvent. This composition may be applied to a coating to be removed by any of the well known methods, such as sprays, brush or flow coat, whereupon the composition forms an adherent film over the coating, which film when completely dry and hardened may be peeled from the coated surface drawing with it the coating and leaving a completely cleaned article.

Dextran is a polysaccharide produced by the action of micro-organisms on a suitable culture medium.

As a specific example, a culture medium containing sucrose in the form of either refined or crude sugar, molasses or the like, together with nitrogen in the form of commercial peptone, beef extract or other similar material, and salts such as dipotassium phosphate and sodium chloride is inoculated with *Leuconostoc mesenteroides* or *Leuconostoc dextranicum*. A typical medium may contain 5 to 10% of sucrose, 0.1% of peptone, 0.2% of dipotassium phosphate and 0.1% of sodium chloride. The pH of the medium is adjusted preferably slightly on the alkaline side of neutrality.

The inoculated culture may be incubated at a temperature most favorable to the growth of the microorganism being used. For *L. mesenteroides* a temperature of about 25° C. is suitable. When the fermentation has been completed the polysaccharide formed is precipitated from the culture by the addition thereto of alcohol or acetone. The precipitate may be purified by further washing with alcohol or acetone.

The dextran thus produced may be re-dissolved and hydrolyzed with acid and the solution fractionated by treatment with isopropyl alcohol to remove the high molecular constituents, leaving a dextran having a molecular weight in the range of 30,000 to 300,000, which is the desired range for the material utilized in the practice of this invention.

Water is preferably chosen as the solvent for the polysaccharide primarily because it provides an inexpensive retarder for slowing of the evaporation of the paint remover solvent.

The paint remover solvent may preferably be an alcohol which is used in the fractionation of the dextran, for example, isopropyl alcohol or ethyl alcohol. However, other solvents having low solubility power for the dextran may be used, such as the monoalkyl esters of glycol. Solvents having some affinity for the dextran may also be used, but if employed should be present in a somewhat larger amount in order that there will be sufficient solvency action on the coating to be removed.

The composition of invention may be formulated by using the fractionated portion of dextran and its precipitant, and adding sufficient water thereto to control the viscosity of the mixture. However, the precipitated dextran may have been dried and freed of its precipitant and under this condition sufficient water should be added to the dextran powder to form a viscous mass. Generally the proportion of water would be in the range of about 15 to 50% on the weight of the total composition, although less water may be satisfactorily used where heavier films and faster drying time of the film are primary requirements.

Paint remover solvent is added to the viscous solution of water and dextran and normally would be present to the extent of about 3 to 8% on the total weight of the composition. Where, however, the paint remover solvent has a solvation action on the dextran itself, the percentage of paint remover solvent may be varied as high as 15% on the total weight of the composition, but should generally not exceed 20% by weight.

The composition of invention may be applied to the coating to be removed by brush or spray methods and the composition should then be dried to a hard film. The time of drying will vary with the water content and may be speeded if desired by the application of heat. The hard film formed will adhere tenaciously to the paint coating to be removed and removal of the same may be perfected by lifting very slightly a tip of the remover film, and applying mechanical force to strip the remover and paint, varnish or lacquer film from the under surface.

The invention will be more fully understood by reference to the following specific examples:

Example I

Approximately 60 grams of a hydrolyzed dextran of an average molecular weight of 100,000 may have added thereto about 35 grams of distilled water and approximately 5 grams of isopropyl alcohol. The resulting mixture is a viscous tacky material and may be applied to a painted surface by brush or by pressure spray method.

Upon application to the painted surface this material should be allowed to dry for approximately 10 to 15 minutes at room temperature, whereupon it will have hardened and become adhered to the paint surface.

The isopropyl alcohol will then have exerted a solvent action on the paint film softening it slightly so that when the dextran film is peeled the paint will fall away cleanly with the dextran film.

Example II

About 90 grams of a hydrolyzed dextran having a molecular weight in the range of 30,000 to 40,000 may have added thereto about 5 grams of water and approximately 5 grams of methyl ethyl ketone. While this material is of a lower molecular weight than that set forth in Example I, the resulting paste is quite viscous and suitable for application by spreading or high pressure spraying methods.

As in Example I the dextran film formed on a coating composition to be removed may be dried within about 10 minutes, and thereafter the composite dextran paint film may be peeled from the surface.

The films formed with the above composition will be somewhat heavier than that formed with more fluid materials, but the drying time will be considerably less.

*Example III*

To approximately 40 grams of a hydrolyzed dextran with an average molecular weight of 200,000 there may be added 50 grams of water and 10 grams of glycerol. The resulting material is sufficiently thin to be applied by spray, brush or flow coat methods.

The action of the paint remover of this example is similar to that attained by the compositions of Examples I and II, the formed dextran film being sufficiently tough to remove paint or varnish readily.

The high water content, however, of the above composition will slow the drying time somewhat, a factor which permits of longer contact and more thorough penetration of the paint remover solvent, but if undesirable may be reduced by the application of heat as by infrared lamp.

The foregoing examples are set forth by way of illustration only and it is not intended that the invention should be limited thereto for the dextran may comprise approximately 40 to 90% by weight of the formula and the other constituents may be varied in their nature or quantity for specific applications.

Paint remover solvent as used in this application is to be understood as a solvent material having solvation power for paints, oils, varnishes, and so forth.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

We claim:

1. A liquid composition for removing varnish and lacquer, said composition being composed of the following ingredients in the approximate proportionate amounts; 60 grams of hydrolyzed dextran, 35 grams of distilled water; and 5 grams of isopropyl alcohol.

2. A liquid composition for removing varnish and lacquer, said composition consisting of hydrolyzed dextran, isopropyl alcohol, and water, the hydrolyzed dextran constituting at least about 40% by weight of the composition, and water in the range of about 15 to 50% by weight of the composition, and isopropyl alcohol from about 3% to 15% by weight of the composition.

References Cited in the file of this patent

UNITED STATES PATENTS

| | | |
|---|---|---|
| 846,080 | Austen et al. | Mar. 5, 1907 |
| 1,129,770 | Wilson | Feb. 23, 1915 |
| 1,143,878 | Alexander | Jan. 22, 1915 |
| 1,980,043 | Ellis | Nov. 6, 1934 |
| 2,229,941 | Stahly et al. | Jan. 28, 1941 |
| 2,392,258 | Ludwell | Jan. 1, 1946 |
| 2,437,518 | Gronwall et al. | Mar. 9, 1948 |
| 2,438,038 | Craver | Mar. 16, 1948 |